United States Patent
Mukherjee et al.

(10) Patent No.: US 10,747,541 B2
(45) Date of Patent: Aug. 18, 2020

(54) MANAGING PREDICTOR SELECTION FOR BRANCH PREDICTION

(71) Applicant: Marvell International Ltd., Hamilton (BM)

(72) Inventors: Shubhendu Sekhar Mukherjee, Southborough, MA (US); David Kravitz, Cambridge, MA (US); Edward J. McLellan, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 85 days.

(21) Appl. No.: 15/880,219

(22) Filed: Jan. 25, 2018

(65) Prior Publication Data

US 2019/0227804 A1 Jul. 25, 2019

Related U.S. Application Data (60) Provisional application No. 62/619,384, filed on Jan. 19, 2018.

(51) Int. Cl.
  *G06F 9/38* (2018.01)
  *G06F 9/30* (2018.01)

(52) U.S. Cl.
  CPC ........ *G06F 9/3806* (2013.01); *G06F 9/30054* (2013.01); *G06F 9/30058* (2013.01); *G06F 9/3867* (2013.01)

(58) Field of Classification Search
  CPC .................................................. G06F 9/3806
  See application file for complete search history.

(56) References Cited

U.S. PATENT DOCUMENTS

| | | | |
|---|---|---|---|
| 5,136,697 A | * | 8/1992 | Johnson ................ G06F 9/3806 712/215 |
| 5,794,028 A | | 8/1998 | Tran |
| 6,079,005 A | | 6/2000 | Witt et al. |
| 6,266,752 B1 | | 7/2001 | Witt et al. |
| 7,552,255 B1 | | 6/2009 | George et al. |

(Continued)

OTHER PUBLICATIONS

Kocher, Paul; Genkin, Daniel; Gruss, Daniel; Haas, Werner; Hamburg, Mike; Lipp, Moritz; Mangard, Stefan; Prescher, Thomas; Schwarz, Michael; Yarom, Yuval, Spectre Attacks: Exploiting Speculative Execution, https://arxiv.org/ arXiv:1801.01203v1 [cs.CR].

(Continued)

*Primary Examiner* — Michael J Metzger
(74) *Attorney, Agent, or Firm* — Young Basile Hanlon & MacFarlane, P.C.

(57) ABSTRACT

Instructions are executed in a pipeline. Storage accessible to the pipeline stores branch prediction information characterizing results of branch instructions previously executed. A predicted branch result is provided, for at least some branch instructions, based on a selected predictor of multiple predictors. An actual branch result is provided based on an executed branch instruction, and the branch prediction information is updated based on the actual branch result. The predictors include: a first predictor that determines the predicted branch result based on at least a portion of the branch prediction information; and a second predictor that determines the predicted branch result independently from the branch prediction information.

26 Claims, 9 Drawing Sheets

(56) References Cited

U.S. PATENT DOCUMENTS

| | | | |
|---|---|---|---|
| 7,856,633 | B1 | 12/2010 | Lee et al. |
| 9,779,028 | B1 | 10/2017 | Mukherjee et al. |
| 2001/0021974 | A1 | 9/2001 | Lee |
| 2002/0078332 | A1* | 6/2002 | Seznec .................. G06F 9/3806 |
| | | | 712/240 |
| 2002/0194462 | A1 | 12/2002 | Henry et al. |
| 2006/0161760 | A1 | 7/2006 | Jordan et al. |
| 2009/0089564 | A1 | 4/2009 | Brickell et al. |
| 2009/0164753 | A1 | 6/2009 | Jungwirth |
| 2010/0058301 | A1 | 3/2010 | Myles et al. |
| 2011/0320789 | A1 | 12/2011 | Prasky et al. |
| 2014/0019738 | A1* | 1/2014 | Kataoka ............. G06F 9/30058 |
| | | | 712/240 |
| 2014/0215720 | A1 | 8/2014 | Escobar |
| 2014/0223145 | A1* | 8/2014 | Makineni .................. G06F 1/32 |
| | | | 712/220 |
| 2014/0365753 | A1 | 12/2014 | Hooker et al. |
| 2015/0006862 | A1* | 1/2015 | Gschwind ............. G06F 9/3861 |
| | | | 712/226 |
| 2015/0046690 | A1* | 2/2015 | Eickemeyer .......... G06F 9/3844 |
| | | | 712/239 |
| 2015/0121050 | A1 | 4/2015 | Williams et al. |
| 2015/0268957 | A1 | 9/2015 | Bonanno et al. |
| 2015/0331691 | A1* | 11/2015 | Levitan ............. G06F 9/30058 |
| | | | 712/240 |
| 2015/0347147 | A1* | 12/2015 | Gschwind ............. G06F 9/3804 |
| | | | 712/238 |
| 2016/0139932 | A1 | 5/2016 | Carlson |
| 2016/0306632 | A1 | 10/2016 | Bouzguarrou |
| 2017/0147346 | A1 | 5/2017 | Hornung et al. |
| 2017/0286421 | A1 | 10/2017 | Hayenga et al. |
| 2018/0225124 | A1 | 8/2018 | Gupta et al. |
| 2019/0213011 | A1* | 7/2019 | Bhat .................... G06F 9/3005 |
| 2019/0227802 | A1 | 7/2019 | Kessler et al. |
| 2019/0227803 | A1 | 7/2019 | Mukherjee et al. |
| 2019/0227804 | A1 | 7/2019 | Mukherjee et al. |

OTHER PUBLICATIONS

Lee, Moon-Sang; Kang, Young-Jae; Lee, Joon-Won; Maeng, Seung-Ryoul, Opts: increasing branch prediction accuracy under context switch, Microprocessors and Microsystems, 2002, pp. 291-300, vol. 26.

Lipp, Moritz; Schwarz, Michael; Gruss, Daniel; Prescher, Thomas; Haas, Werner; Mangard, Stefan; Kocher, Paul; Genkin, Daniel; Yarom, Yuval; Hamburg, Mike, Meltdown, https://arxiv.org/ arXiv:1801.01207v1 [cs.CR].

Michaud, Pierre; Seznec, Andre; Uhlig, Richard, Trading Conflict and Capacity Aliasing in Conditional Branch Predictors, ISCA '97 Denver, CO, USA, pp. 292-303.

* cited by examiner

MANAGING PREDICTOR SELECTION FOR BRANCH PREDICTION

CROSS-REFERENCE TO RELATED APPLICATIONS

This application claims the benefit of U.S. Provisional Application No. 62/619,384, filed Jan. 19, 2018, which is incorporated herein by reference.

BACKGROUND

The invention relates to managing predictor selection for branch prediction.

A processor pipeline includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a conditional branch instruction to determine whether or not the branch will be taken. Finally, an instruction is committed, which may involve storing a result (e.g., in a write back (WB) stage or stages).

Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time). At the end of that block of instructions there may be a branch instruction that is either an unconditional branch instruction associated with a branch target address to which the PC will jump, or a conditional branch instruction that has a condition that is to be evaluated to yield a Boolean branch direction result. For example, a '0' branch direction result may indicate that the branch is not taken (NT) and the PC continues to advance sequentially to the next address in a current or subsequent block, and a '1' branch direction result may indicate that the branch is taken (T) and the PC jumps (i.e., non-sequentially) to a branch target address at the start of a new block of instructions.

There are various situations in which it may be useful to speculatively fetch an instruction that is dependent on the result of a branch instruction before that result has actually been determined. Processor architectures that support such speculation use branch prediction to determine a "predicted branch result" that is used in early stages of the pipeline (e.g., a predicted branch direction, and/or a predicted branch target), which may or may not agree with the "actual branch result" that will eventually be determined in a later stage of the pipeline. If the predicted branch result does not agree with the actual branch result, then the pipeline is flushed of any incorrect instructions and the correct instructions are fetched.

SUMMARY

In one aspect, in general, an integrated circuit comprises: at least one processor executing instructions in a pipeline, the instructions including branch instructions; storage accessible to the pipeline for storing branch prediction information characterizing results of branch instructions previously executed by the processor; first circuitry configured to provide a predicted branch result, for at least some branch instructions, based on a selected predictor of a plurality of predictors; and second circuitry configured to provide an actual branch result based on an executed branch instruction, and to update the branch prediction information based on the actual branch result; wherein the plurality of predictors include: a first predictor that determines the predicted branch result based on at least a portion of the branch prediction information; and a second predictor that determines the predicted branch result independently from the branch prediction information.

In another aspect, in general, a method comprises: executing instructions in a pipeline of at least one processor, the instructions including branch instructions; storing, in storage accessible to the pipeline, branch prediction information characterizing results of branch instructions previously executed by the processor; providing, from first circuitry, a predicted branch result, for at least some branch instructions, based on a selected predictor of a plurality of predictors; and providing, from second circuitry, an actual branch result based on an executed branch instruction, and updating the branch prediction information based on the actual branch result; wherein the plurality of predictors include: a first predictor that determines the predicted branch result based on at least a portion of the branch prediction information; and a second predictor that determines the predicted branch result independently from the branch prediction information.

Aspects can include one or more of the following features.

Providing a predicted branch result, for at least some branch instructions, includes providing a predicted branch result based at least in part on a selected mode of a plurality of modes of operation, where the plurality of modes of operation include: a first mode of operation in which the predicted branch result is determined based on at least a portion of the branch prediction information, and a second mode of operation in which the predicted branch result is determined based on a selected predictor of the plurality of predictors, where selection of the selected predictor varies for different branch instructions for which the predicted branch result is being provided.

Providing a predicted branch result for a first branch instruction includes: determining that the first branch instruction is associated with a privilege level in a predetermined subset of one or more privilege levels, and in response to the determining, setting the selected mode to the second mode of operation.

Providing a predicted branch result for a second branch instruction includes: determining that the second branch instruction is associated with a privilege level outside the predetermined subset of one or more privilege levels, and in response to the determining, setting the selected mode to the first mode of operation.

The second predictor provides a first constant branch result value as the predicted branch result for all virtual addresses of branch instructions for which the predicted branch result is being provided.

The plurality of predictors include a third predictor that provides a second constant branch result as the predicted branch result for all virtual addresses of branch instructions for which the predicted branch result is being provided, where the second constant branch result is different from the first constant branch result.

The second predictor is selected for branch instructions that are executed during an operation performed by the processor to clear at least a portion of the branch prediction information used for providing predicted branch results for multiple different branch instructions.

The operation performed by the processor comprises an operation to clear all of the branch prediction information stored in the storage.

The operation performed by the processor comprises a built-in self-test operation that selectively clears at least a portion of the branch prediction information stored in the storage without clearing all memory structures on the processor.

The updating of the branch prediction information by the second circuitry is disabled for a first branch instruction when the second predictor is selected for the first branch instruction.

Selection of the selected predictor varies for different branch instructions based at least in part on a randomized value.

The selected predictor is selected using hardware within the first circuitry.

The selected predictor is selected using software executing on the processor at a privilege level in the predetermined subset of one or more privilege levels.

The branch instructions include conditional branch instructions, and the prediction information includes one or both of: (1) branch direction predictions that indicate whether a particular predicted branch result includes a taken (T) direction or a not taken (NT) direction, and (2) branch target predictions that indicate branch target addresses that are included within particular predicted branch results that also include a taken (T) direction.

Aspects can have one or more of the following advantages.

In some cases, side effects of incorrect instructions that were speculatively executed may persist long enough to make higher-privileged software executing on the processor vulnerable to attacks by lower-privileged software. For example, some such vulnerabilities are described in "Spectre Attacks: Exploiting Speculative Execution" arXiv: 1801.01203 [cs.CR], and "Meltdown" arXiv:1801.01207 [cs.CR], each of which is incorporated herein by reference. A privilege level can be determined based on one or more of an exception level, and/or a security level, for example, and is part of, and/or determined by an instruction's context. The privilege level generally determines the access rights associated with a particular context. The context associated with an instruction can include information about a privilege level, and information about other characteristics, including for example, the instruction's virtual address being within a particular virtual address space, or the instruction being associated with a particular virtual machine, or other attributes that define an environment in which an instruction having that context is executed. Instructions associated with different contexts are generally intended to execute in isolation. Security concerns arise from the unintended ability to transfer information between contexts. One of the features of some processors that allows a program executing lower-privileged instructions to attack a program executing higher-privileged instructions is the state of a branch predictor.

The techniques described herein are able to mitigate certain potential vulnerabilities for certain microprocessor architectures (e.g., the ARMv8 microprocessor architecture), while still maintaining performance. In particular, the techniques are able isolate a predictor's state for different contexts, which is useful for improved security. For example, without such isolation, a lower-privileged program can "warm up" a branch predictor by executing carefully crafted code. When the higher-privileged program executes out of the same branch predictor state, the lower-privileged program can predict which path is taken by the higher-privileged program by timing the higher-privileged program's execution, which causes a security vulnerability. The isolation of a predictor's state for different contexts, is also useful for performance. Because different contexts may have different branch predictor behavior, isolating branch predictor state between contexts can also help increase branch prediction accuracy, which improves performance.

While some of the existing techniques for increasing the prediction accuracy of branch prediction could also be used to mitigate some of these vulnerabilities, they do not necessarily maintain security and performance at the same time. For example, there are some existing techniques for saving and restoring a branch predictor table when a context switch occurs. But, perfect saving and restoring of an entire branch predictor table upon every context switch may take so much time that it is impractical. However, a partial or otherwise imperfect save and restore may allow some pollution between different contexts that increases the vulnerabilities. Also, such a static partitioning of branch prediction information into separate tables does not achieve the same flexibility as dynamic partitioning of a single table (or other data structure) with different entries being assigned to different partitions during execution.

Other features and advantages of the invention will become apparent from the following description, and from the claims.

DESCRIPTION

Figure 1:
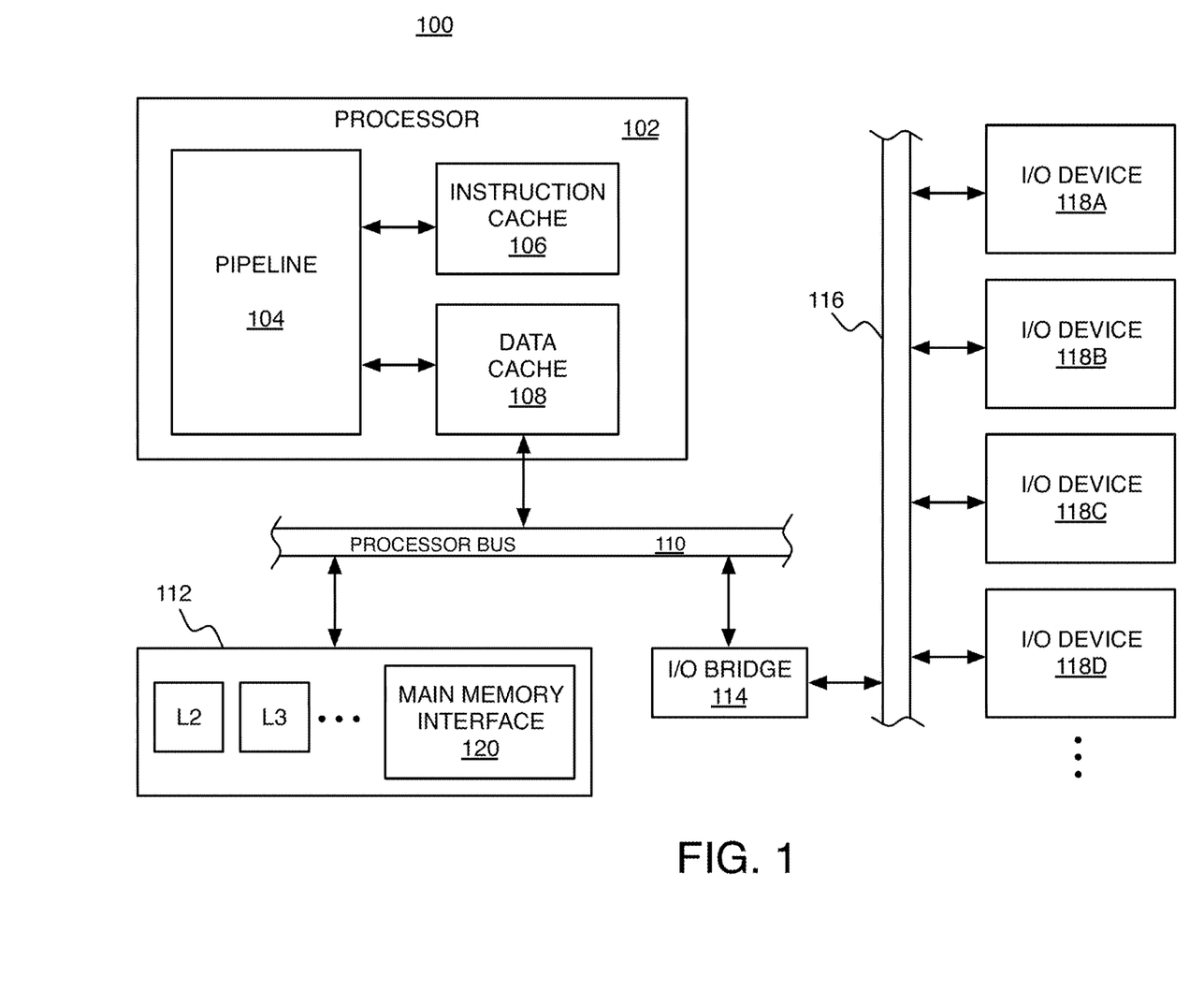
FIG. 1 is a schematic diagram of a computing system.

FIG. 1 shows an example of a computing system 100 in which the microprocessor architecture described herein could be used. The system 100 includes at least one processor 102, which could be a single central processing unit (CPU) or an arrangement of multiple processor cores of a multi-core architecture. In this example, the processor 102 includes a pipeline 104, an instruction cache 106, and a data cache 108 (and other circuitry, not shown). The processor 102 is connected to a processor bus 110, which enables communication with an external memory system 112 and an input/output (I/O) bridge 114. The I/O bridge 114 enables communication over an I/O bus 116, with various different I/O devices 118A-118D (e.g., disk controller, network interface, display adapter, and/or user input devices such as a keyboard or mouse).

The external memory system 112 is part of a hierarchical memory system that includes multi-level caches, including the first level (L1) instruction cache 106 and data cache 108, and any number of higher level (L2, L3, . . . ) caches within the external memory system 112. Other circuitry (not shown) in the processor 102 supporting the caches 106 and 108 includes a translation lookaside buffer (TLB), various other circuitry for handling a miss in the TLB or the caches 106 and 108. For example, the TLB is used to translate an address of an instruction being fetched or data being referenced from a virtual address to a physical address, and to determine whether a copy of that address is in the instruction cache 106 or data cache 108, respectively. If so, that instruction or data can be obtained from the L1 cache. If not, that miss is handled by miss circuitry so that it may be executed from the external memory system 112. Of course, this is only an example. The exact division between which level caches are within the processor 102 and which are in the external memory system 112 can be different in other examples. For example, an L1 cache and an L2 cache could both be internal and an L3 (and higher) cache could be external. The external memory system 112 also includes a main memory interface 120, which is connected to any number of memory modules (not shown) serving as main memory (e.g., Dynamic Random Access Memory modules).

Branch predictors are an integral part of modern pipelined microprocessors. Typically, it takes multiple clock cycles to execute an instruction. For example, it takes one or more cycles for each of different stages, including stages to fetch, decode, execute, and retire an instruction. Typically, modern microprocessors are between 10 to 25 cycles in duration from beginning to end. A potential difficulty is that when a program encounters a branch instruction, that instruction may change the control flow, so the correct next instruction to be executed is not known with certainty until after the branch instruction reaches a certain stage potentially deep into the pipeline. To avoid this potential difficulty, modern microprocessors employ a branch predictor, which predicts the direction for conditional branch instructions as taken (T) or not taken (NOT) (e.g., an "if path" or "else path" in a program), and/or predicts a target address of the branch instruction for an unconditional branch instruction or for a conditional branch instruction that is taken. If the prediction is correct, it enables the pipeline stages to continue to be fed with new instructions. But, if the prediction is incorrect (i.e., a "misprediction"), there is a disruption while the incorrect instructions are flushed.

To predict the direction or target address of a branch instruction, branch predictors include storage for various branch prediction information and circuitry for setting and updating that branch prediction information, as described in more detail below. The branch prediction information can be stored in a variety of types of data structures within storage circuitry, such as storage circuitry organized as a table, that represent a collection of entries that are accessed using an index value. The index is typically formed based on certain predetermined bits of the program counter (PC). For example, different bits of the PC are combined with a bit-wise function, such as an XOR, to create an index into a branch prediction data structure.

The PC used to fetch the next instruction to be executed is typically a virtual address of an instruction, where that virtual address is associated with a particular process (e.g., within a virtual address space associated with that process). This causes potential interference among different processes when they index into the branch prediction data structure, because branch behavior of different processes is typically different. For example, system code executing at a higher privilege level (e.g., a higher exception level), would exhibit different branch behavior than user code executing at a lower privilege level (e.g., a lower exception level). The same branch instruction virtual address from two different processes may map to the same index, but those branch instructions may exhibit different branch behavior (e.g., one is T, and the other is NT). Consequently, branch prediction state from one process may pollute the branch prediction state of another process.

Figure 2:
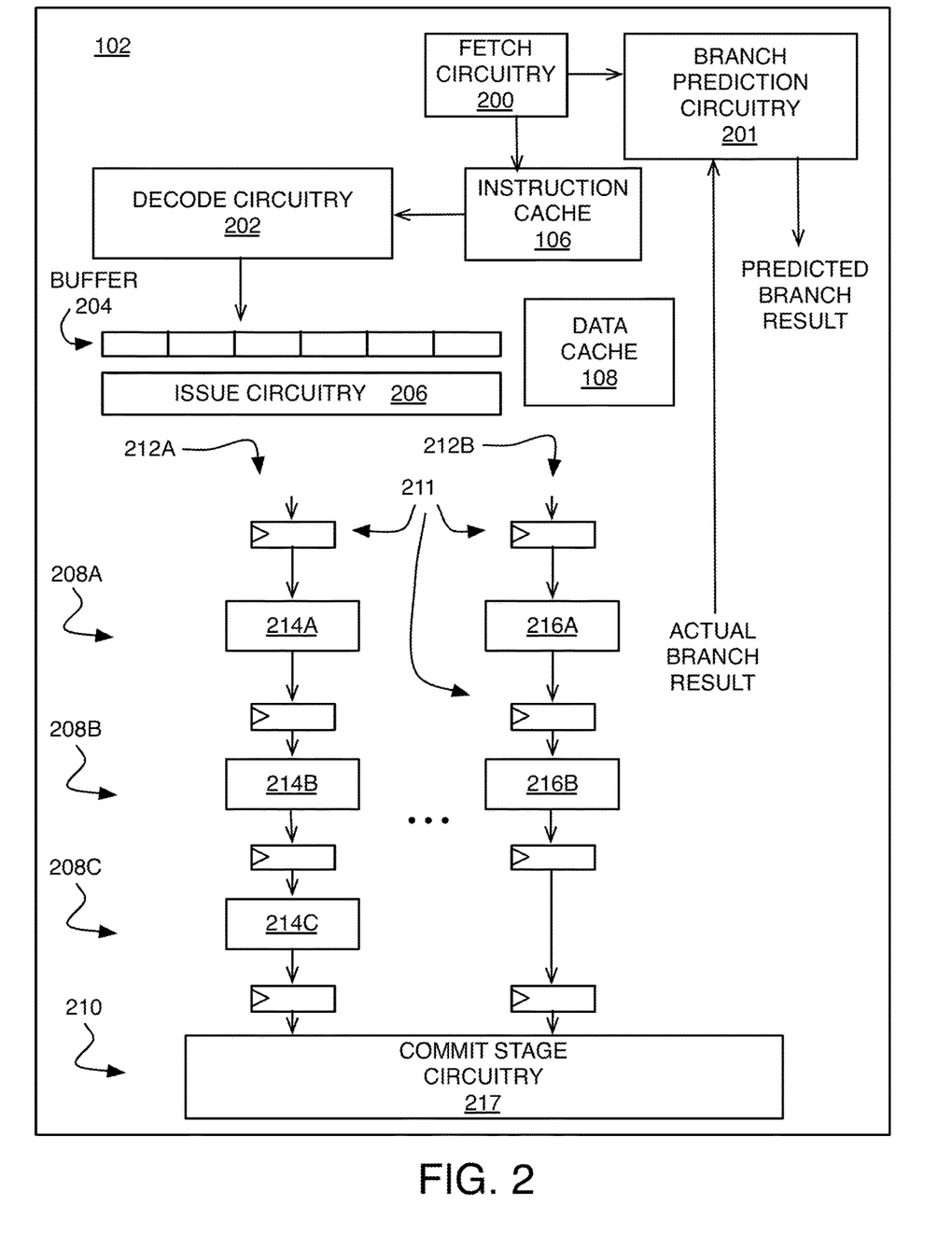
FIG. 2 is a schematic diagram of a processor.

FIG. 2 shows an example in which the processor 102 is a superscalar processor configured to use branch prediction for speculative execution of instructions. The processor 102 includes circuitry for the various stages of the pipeline 104. For one or more instruction fetch stages, instruction fetch circuitry 200 provides a PC to the instruction cache 106 to fetch instructions to be fed into the pipeline 104. For example, the PC can be a virtual address of the next instruction, in which case the PC can be incremented by the length of a virtual address in the case of sequential execution (i.e., without taking any branches of branch instructions). The fetch circuitry 200 also provides the program counter to branch prediction circuitry 201, which will be used to provide a predicted result for branch instructions, as described in more detail below. In some implementations, some or all of the branch prediction circuitry 201 is considered part of the fetch circuitry 200. For one or more instruction decode stages, instruction decode circuitry 202 stores information in a buffer 204 for instructions in the instruction window waiting to be issued.

Issue circuitry 206 determines in which cycle instructions in the buffer 204 are to be issued, which makes them available to progress through circuitry of the execution stages 208A, 208B, and 208C of the pipeline 104. (This example has three execution stages, but other examples may have more or fewer execution stages.) There is also at least one commit stage 210 that commits results of instructions that have made their way through the execution stages 208A, 208B, and 208C. For example, commit stage circuitry 217 may write back a result into a register file (not shown).

The instruction window includes instructions that have not yet issued (in the buffer 204), and instructions that have been issued but are still "in flight" and have not yet been committed. As instructions are issued, more instructions enter the instruction window by being stored in the buffer 204. Instructions leave the instruction window after they have been committed, but not necessarily in one-to-one correspondence with instructions that enter the instruction window. Therefore the size of the instruction window may vary. Instructions enter the instruction window in-order (i.e., according to a program order), and leave the instruction window in-order. But, in some implementations instructions may be issued and/or executed out-of-order.

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture, but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include a units for various operations (e.g., ALU, multiplier, floating point unit), and another path may include circuitry for computing branch conditions for branch instructions, which provides an actual result of the branch instruction (e.g., 1: taken, 0: not taken) based on evaluating a branch condition for updating the branch prediction circuitry 201.

One effect that the branch prediction circuitry 201 has on the pipeline 104 is to cause a flush of certain stages of the pipeline under certain circumstances. In particular, there are two different circumstances in which a flush or partial flush may occur.

In an example of a first circumstance, after a branch condition has been evaluated and an actual branch result is determined during execution of a branch instruction, that actual branch result is compared with the predicted branch result that was previously provided from the branch prediction circuitry 201. If the predicted branch result matches the actual branch result, then the prediction was correct. However, if the predicted branch result does not match the actual branch result, then a misprediction occurred and all of the stages of the pipeline are flushed and the whole pipeline is restarted at the branch target instruction (if the actual branch result is T), or the fall-through instruction (if the actual branch result is NT).

In an example of a second circumstance, there is a partial flush that may be required for just the earlier stages in the pipeline. The fetch circuitry 200 will typically send incrementing values of the PC to the instruction cache 106. After the instructions come back from the instruction cache and are decoded by the decode circuitry 202, the branch prediction circuitry 201 may output a predicted branch result that indicates a taken branch. At that point the previous two PC addresses sent to the instruction cache, in the two previous cycles, are incorrect because they were for instructions sequentially after the branch instruction and not for the branch target. The values in the pipeline stages corresponding to these two cycles of instructions coming from the instruction cache 106 will be discarded, but not other values deeper in the pipeline 104 (corresponding to earlier instructions not affected by the predicted taken branch result).

The branch prediction information used to determine the predicted branch results, if shared by different contexts, is a potential security vulnerability. A lower-privileged "adversary program" executing with a different context than a higher-privileged "victim program" is able to warm up a shared branch predictor so that when the victim program executes a particular branch instruction (e.g., corresponding to a particular if statement executed as part of a system call), a particular predicted branch direction is provided. The adversary program may be configured (e.g., by reverse-engineering known code of the victim program) to force a predetermined predicted branch direction, either deterministically or with high probability. For example, a particular entry within a branch prediction data structure associated with a particular virtual address of the particular branch instruction may be known, and the adversary program can train that particular entry to force the predetermined direction to be provided as the resulting predicted branch direction. Alternatively, the adversary program can train multiple entries, or even all the entries, to provide the predetermined direction. If the forced direction was a misprediction, the execution of the particular instruction will take longer than it would if the forced direction was a correct prediction. The adversary program is then able to learn which actual branch direction was executed by the victim program by measuring the number of clock cycles elapse to complete execution of the particular instruction. This is just an example of potential information that is vulnerable to be learned by the adversary program—other potential vulnerabilities are also possible. For example, the adversary program can force a predetermined predicted branch target address to be provided.

Some techniques to mitigate vulnerabilities associated with branch predictor state being shared by different contexts rely on an initial translation of the virtual address of a particular branch instruction that the PC provides to the branch prediction circuitry. Modern processors support virtual memory, which allows program instructions being executed by a CPU to refer to data using virtual addresses within a virtual address space that is larger than a physical address space that is defined by the size of main memory. The instructions themselves, which are also stored in memory, can also be referenced using virtual addresses. Virtual memory involves address translation from one or more such virtual address spaces into a physical address space. The translation is performed using a page table that stores mappings between virtual addresses and physical addresses at a granularity of memory pages. Some processors also support various kinds of virtualization that involve virtual machines (VMs). For example, a hypervisor (also called a virtual machine monitor (VMM)) can run on the physical system to manage all of the guest operating systems of a virtualized system. The hypervisor runs at higher-privileged access level than the guest operating systems. So only the hypervisor has access to the physical address space. Therefore, each guest operating system is provided its own intermediate physical address space into which one or more virtual address spaces are translated, and the hypervisor translates intermediate physical addresses into physical addresses.

When establishing a translation from a particular virtual address to a particular physical address or intermediate physical address, various types of context information is used to distinguish otherwise identical virtual addresses from each other. This enables multiple independent virtual address spaces to exist for different processes or different virtual machines or any of a variety of other differentiating characteristics that support different virtual address spaces. Various portions of the context information can be used for differentiating between virtual addresses that are in use within different virtual address (VA) to physical address (PA) translations (or VA to intermediate physical address (IPA) translations, or IPA to PA translations). For example, an operating system may use an address space identifier (ASID) (e.g., 16 bits) to identify a memory space (a virtual address space) associated with a running process. A hypervisor may use a virtual machine identifier (VMID) (e.g., 16 bits) to identify a memory space (intermediate physical address space) associated with a guest operating system of a virtual machine. Certain parameters may be associated with different classes of processes or software environments that are available in an architecture, such as a security state with values of secure (S) or non-secure (NS), or an exception level (also called a 'priority level') with values of EL0-EL3 (for a 2-bit exception level), for example. All of this context information together comprises a context (also called a "translation context" or a "software context") for a particular virtual address (e.g., the virtual address of an instruction such as a branch instruction).

FIGS. 3A-3F show different examples of branch prediction circuitry configured to apply different techniques to mitigate vulnerabilities associated with branch predictor state being shared by different contexts.

Figure 3A:
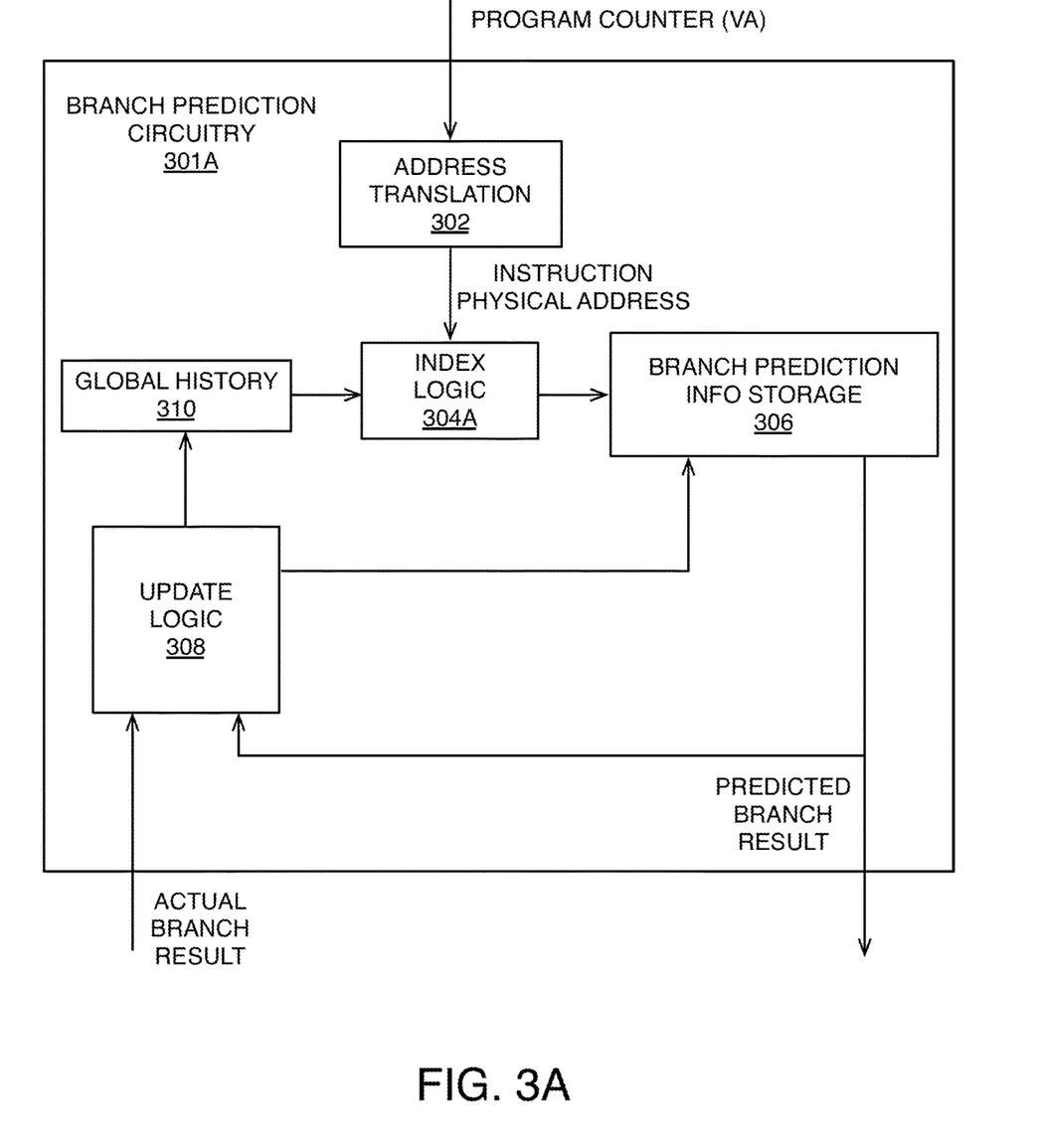
FIGS. 3A-3F are a schematic diagrams of branch prediction circuitry.

FIG. 3A shows branch prediction circuitry 301A configured to perform branch prediction using a technique based on address translation. Two different processes, such as a process running an adversary program and a process running a victim program, will generally have different contexts. Typically, certain predetermined bits of a virtual address are used to generate an index value used to access an entry within the branch prediction data structure. Virtual addresses that have different context but happen to share those predetermined bits (or happen to be identical, sharing all bits) would then lead to the same index value, which could lead to some of the vulnerabilities described above. So, instead of indexing the branch prediction data structure using the virtual address, this address-translation technique uses a physical address (or intermediate physical address) to generate the index value. An address translation module 302 performs this address translation on a received instruction virtual address (corresponding to the program counter value) to provide an instruction physical address to index logic 304A. Alternatively, the translated address provided to the index logic 304A could be an instruction intermediate physical address. Determining a translated address that has been translated form a virtual address may include looking up a translation in a translation lookaside buffer.

Predetermined bits of this instruction physical address are then used (e.g., using exclusive OR (XOR) operations) to generate an index value for accessing an entry of the branch prediction data structure stored in branch prediction information storage 306. Since virtual address spaces for different processes (having different contexts) are typically mapped into separate areas in the physical address space (with perhaps some sharing), this increases the chances that the entries will differ among different processes. This also mitigates the certain types of vulnerabilities because a lower-privileged process cannot typically predict what particular physical address might map to a particular virtual address for a context different than its own (e.g., for a context of a higher-privileged process). The address translation module 302 can include, for example, additional micro-translation buffers. While such translation may add extra cycles into the pipeline front-end, the advantages in prediction accuracy may outweigh the cost of such translation. In some implementations, even if there is translation of an instruction virtual address performed for other reasons (e.g., for an instruction cache 106 that is physically indexed and/or physically tagged), the translation for branch prediction may occur earlier (e.g., translation being initiated in an earlier pipeline stage) than it would for instruction cache access. For example, looking up the translation may occur in an earlier pipeline stage than a pipeline stage in which the instruction cache is accessed.

Each entry of the branch prediction data structure (corresponding to a particular index) will store branch prediction information for one or more instruction addresses. The branch prediction information is used to determine a predicted branch result. For example, the branch prediction information may include a 2-bit value of bimodal branch direction predictor, such as the 2-bit saturating counter described below with reference to FIG. 4. States '10' or '11' indicate the branch should be predicted taken (T), and states '00' or '01' indicate the branch should be predicted not taken (NT). The information stored in and provided from the branch prediction information storage 306 varies for different types of branch instructions, including conditional branch instructions, and unconditional branch instructions. For conditional branch instructions, the information stored within indexed entries includes branch direction predictions that indicate whether a particular predicted branch result includes a taken (T) direction or a not taken (NT) direction. For conditional branch instructions, there may also be branch target predictions, either in the same data structure or in an associated data structure (e.g., a branch target buffer) that is indexed by the same index value. The branch target predictions indicate branch target addresses that are included within particular predicted branch results that also include a taken (T) direction. For unconditional branch instructions, since no direction is needed (because the branch is always taken), the information stored within indexed entries includes the branch target predictions that indicate branch target addresses provided as particular predicted branch results.

The predicted branch result is provided as output from the branch prediction circuitry 301A, and is also fed back within the circuitry to update logic 308. The update logic 308 also receives the actual branch result from a later stage of the pipeline to update the information within the branch prediction information storage 306. The index value can also optionally be computed using other information in addition to the virtual or physical address of a program counter. In the illustrated examples, the update logic 308 is used to update a global history storage 310 storing branch history information in the form of a bit vector representing a past history of branch results from the most recent series of branch instructions. For example, the bit vector may be stored in a shift register that is updated based on actual branch results provided by commit stage circuitry 217. When a new bit value is shifted in to the bit vector (a 1 representing a taken branch or a 0 representing a not taken branch), the oldest bit value will be shifted off the end. The index logic 304A can combine bits from the global history with bits from the PC address to compute the index value.

Figure 3B:
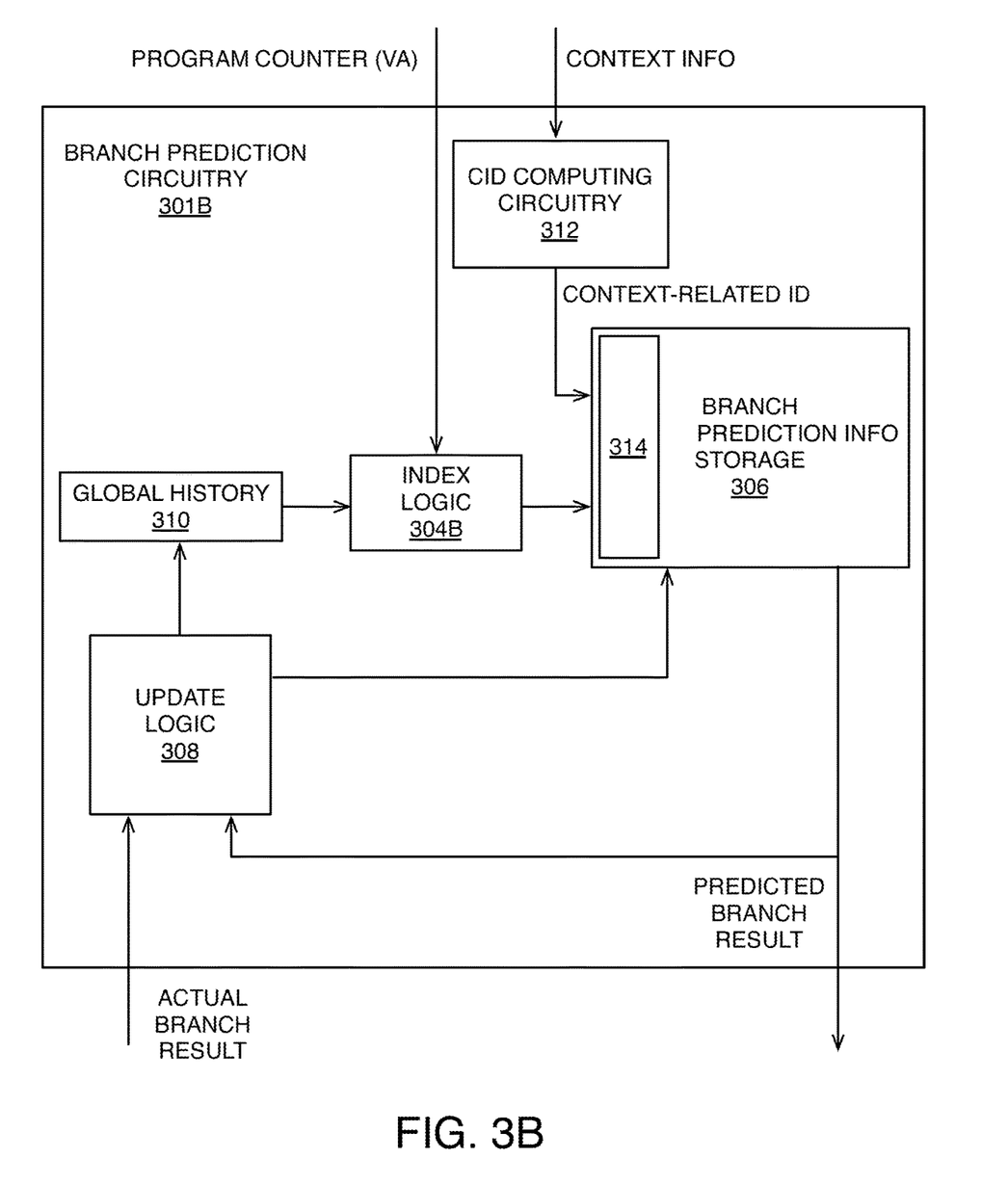

FIG. 3B shows branch prediction circuitry 301B configured to perform branch prediction using a technique based on a context-related identifier that can be used to dynamically partition the storage 306 into partitions of various sizes (i.e., a variable number of entries). Each entry in the branch prediction data structure can be tagged with a computed context-related identifier (CID) computed by CID computing circuitry 312 based on at least a portion of received context information associated with the branch instruction virtual address represented by the received PC. The index logic 304B computes an index value for a given branch instruction based on the untranslated virtual address represented by the PC. The CID for a given branch instruction is stored in a portion of the storage 306 that is used for tagging entries, referred to as the CID storage 314. The CID computing circuitry 312, the CID storage 314, and other circuitry of the branch prediction information storage 306 can be configured similar to the circuitry within a set-associative cache, where the CID operates as the cache tag and the index value operates as the cache index. For example, a CID can be stored as part of a tag within a content-addressable memory (CAM), or as part of a tag that distinguishes different regions of a random-access memory (RAM).

The CID represents either the full context information or partial context information. In some architectures, for example, the full context information may include 35 bits for: 2-bit exception level (EL), 1-bit non-secure/secure (NS/S) value, 16-bit VMID, and 16-bit ASID. Such complete context information will more completely segregate one process from another, which is helpful for mitigating security vulnerabilities. But, there is potentially significant overhead in terms of integrated circuit area devoted to the CID storage 314. To reduce the overhead, the CID can include partial context information, such as only the 16-bit VMID and the 2-bit EL. Such partial context information would uniquely identify different subsets of contexts, each subset containing fewer than all contexts, and each subset not overlapping with any other subset. This can protect against one VM polluting another VM's branch predictor.

Alternatively, instead of simply concatenating subsets of bits from the full context information, techniques can be used to essentially compress full context information into fewer bits. The CID computing circuitry 312 can compute a CID that is configured to include fewer bits than the full context information, where those bits are assigned based on a stored mapping between CIDs and a corresponding full context information string. The mapping can be stored in the branch prediction circuitry 301B. While the mapping itself takes space on the integrated circuit, more space can be saved in the CID storage 314. This works effectively to mitigate some of the vulnerabilities since at any one point of time there may be only a relatively small number of contexts currently in use (i.e., contexts that have been mapped by the stored mapping). Instead of a maximum of billions of simultaneous contexts (where 35 bits yields $2^{35}$, or 32 billion different contexts) it may be sufficient for a modern microprocessor to be able to run thousands, or hundreds, or only tens of simultaneous contexts (e.g., 6 bits yields $2^6$, or 64 different contexts). So, if each context currently in use is mapped to a unique CID, there is still the same ability to mitigate against certain security vulnerabilities as there is using the full context information. In other words, the CID is assigned as a sequence bits to uniquely identify the context associated with a particular branch instruction among all contexts currently in use, where the assigned sequence of bits contains fewer bits than all bits associated with the context associated with the particular branch instruction. Additional details about techniques for compressing context information can be found, for example, in U.S. Pat. No. 9,779,028, entitled "MANAGING TRANSLATION INVALIDATION," which is incorporated herein by reference.

Figure 3C:
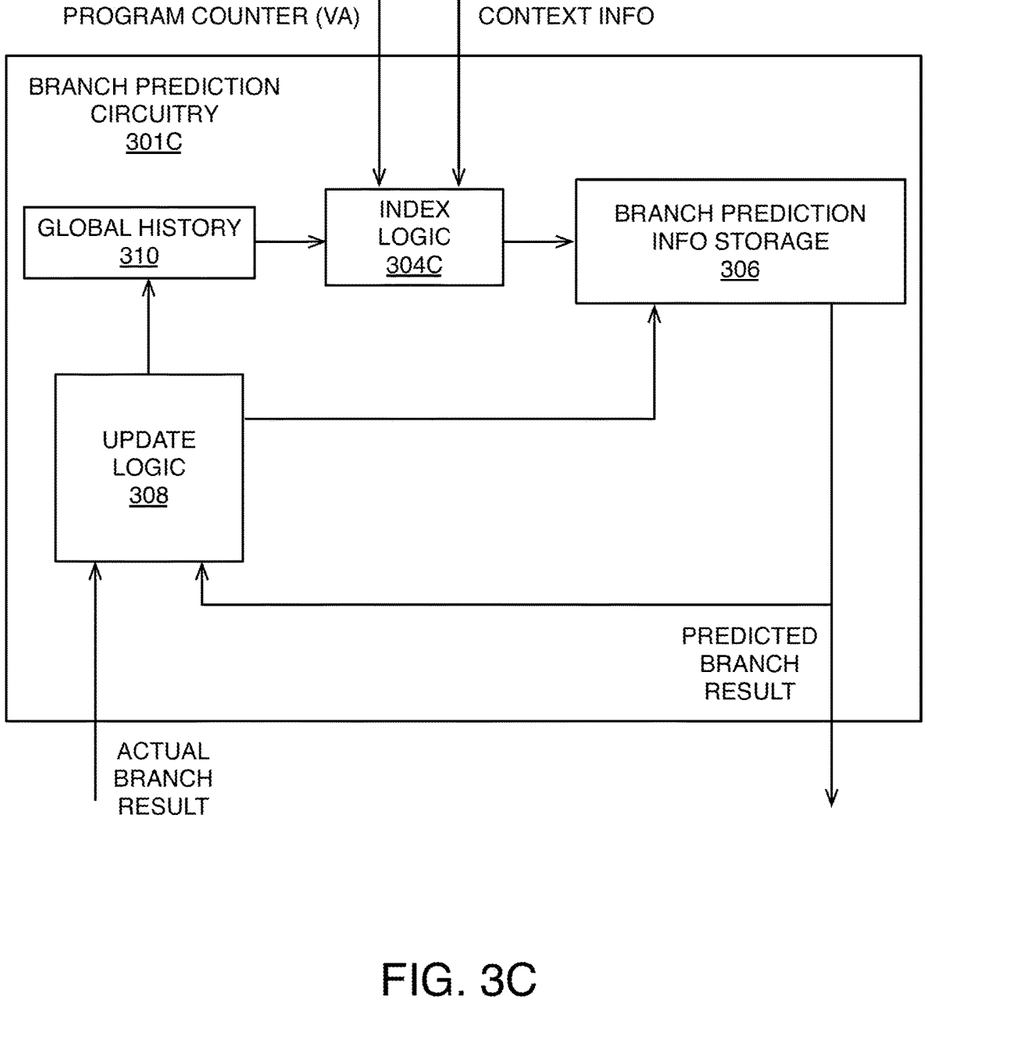

FIG. 3C shows branch prediction circuitry 301C configured to perform branch prediction using a technique that is also based on context information, but instead of computing a separate CID, index logic 304C uses both the branch instruction virtual address represented by the PC and context information (full or partial) to compute an index value (e.g., using predetermined bits of each, combined using XOR operations). This technique will probabilistically reduce the collision among various processes, and thus reduce the chance of one process polluting another process's branch prediction information, still mitigating the security vulnerability.

Figure 3D:
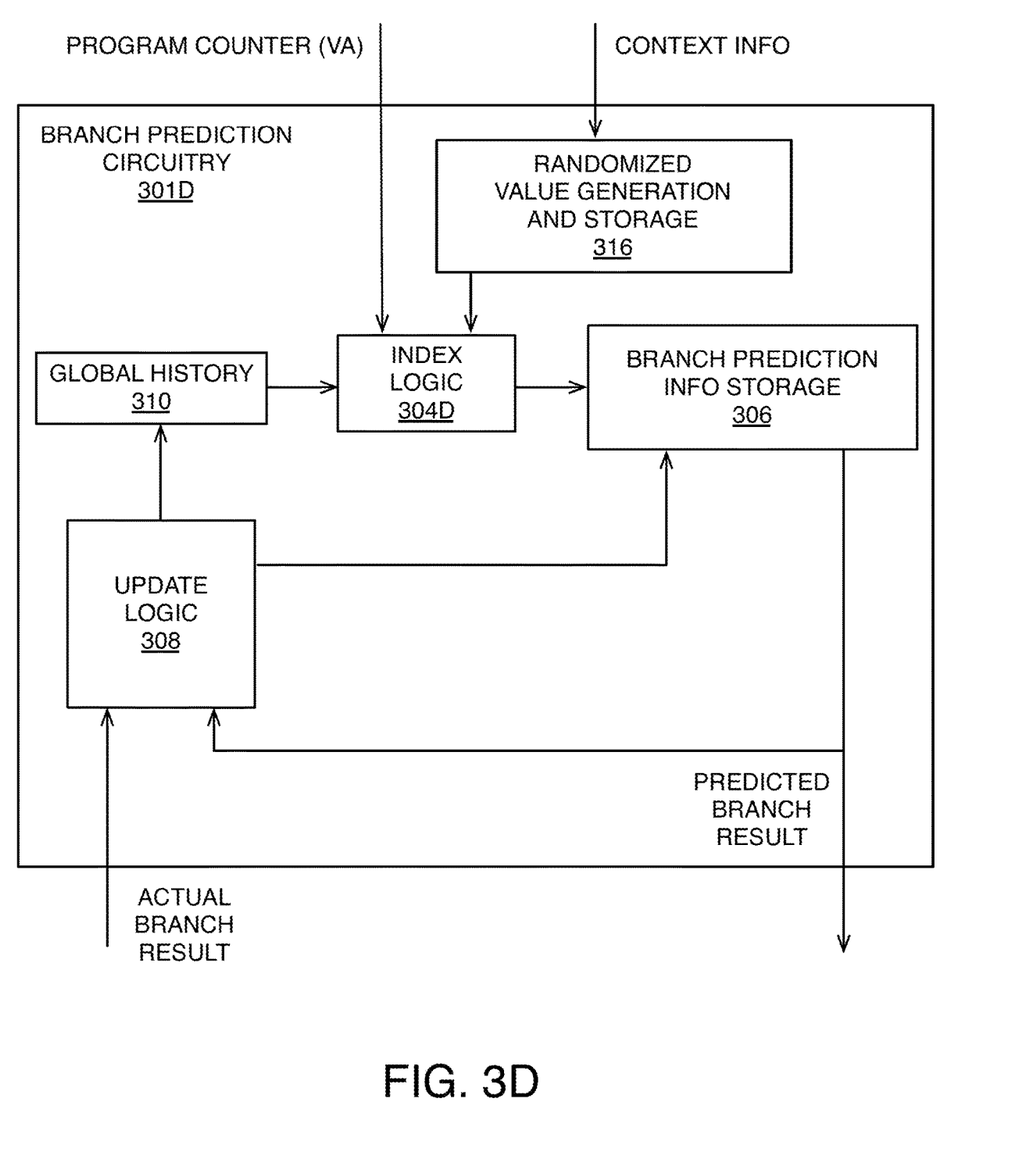

FIG. 3D shows branch prediction circuitry 301D configured to perform branch prediction using a technique based on randomization. A randomized value can be generated using any of a variety of techniques. For example, pseudo-random number generation can be performed in hardware using a device such as a linear-feedback shift register (LFSR), and/or a non-digital device on the integrated circuit that implements the processor, such as a device including analog circuitry. Alternatively, a randomized value can be generated in software using an appropriate algorithm, or in a combination of hardware and software. The circuitry 301D includes circuitry 316 for randomized value generation and storage. The circuitry 316 is able to generate a randomized value for each context, or for each subset of contexts, and store that randomized value in association with that context or subset of contexts (e.g., a subset of context mapped to a particular CID). The index logic 304D then uses both the branch instruction virtual address represented by the PC and the particular randomized value to compute an index value. For example, the computation can use a hash function that takes both the PC and the randomized value as input and generates an index value (e.g., using XOR operations). The stored randomized values can also be periodically changed to further mitigate against potential security vulnerabilities, with some reduction in performance when the implicit partitioning represented by the index value computation changes. With the randomized values stored with access restricted to high privilege levels, some potential security vulnerabilities are mitigated because an adversary program at a lower privilege level is not able to access the randomized values.

Figure 3E:
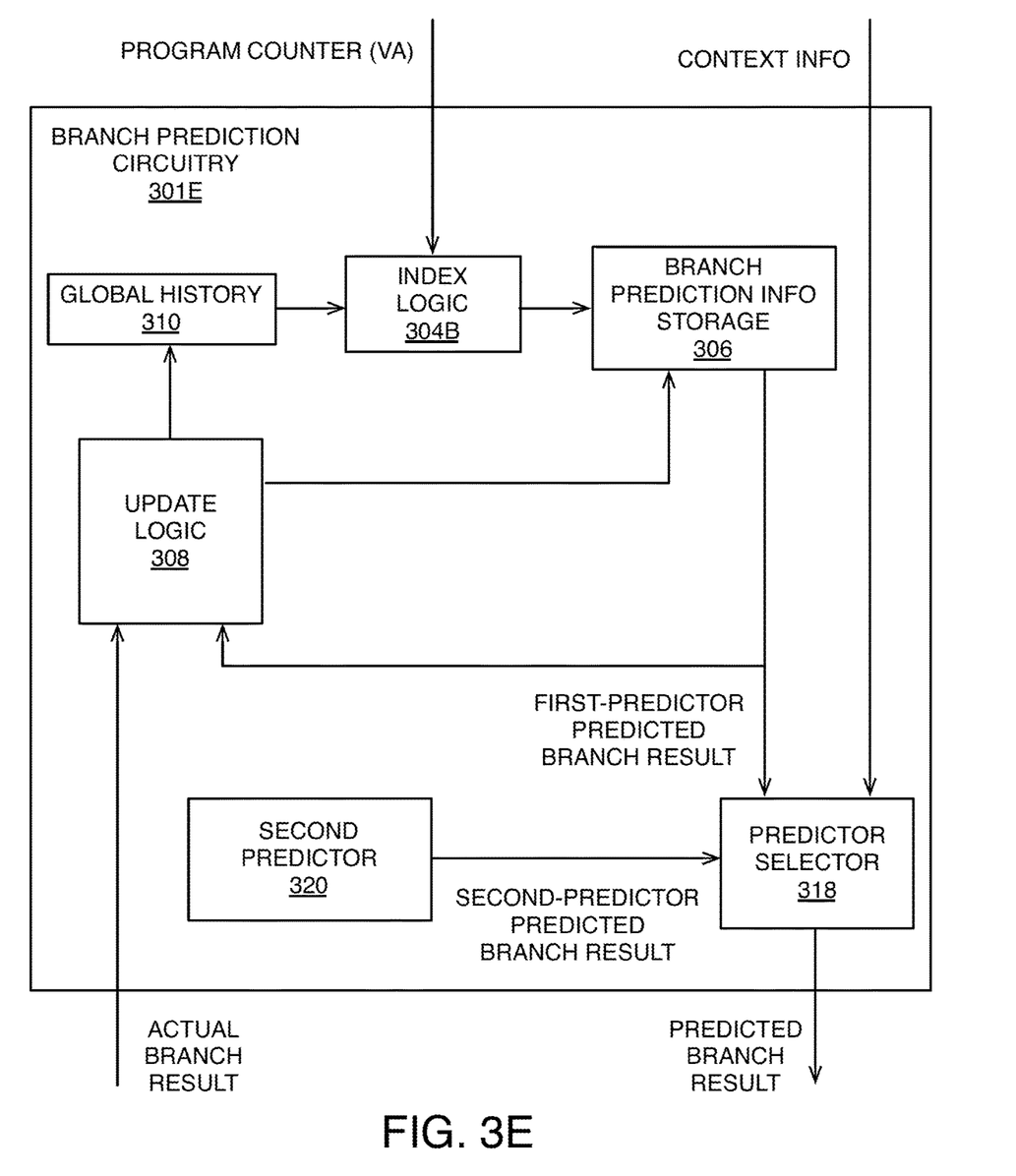

FIG. 3E shows branch prediction circuitry 301E configured to perform branch prediction using a technique based on varying selection among multiple different predictors. This varying selection prevents an adversary program from reliably forcing a misprediction by the prediction circuitry 301E. For example, one way this can be accomplished is by randomizing the predictor to be used, and thus randomizing its corresponding prediction, for at least one or more higher privilege levels. That way an adversary program at a lower privilege level is not able to reliably warm up the prediction used by a victim program at a higher privilege level.

In this example, the index logic 304B that computes an index value for a given branch instruction based on the untranslated virtual address represented by the PC can be used. Alternatively, any of the previous techniques of FIGS. 3A-3D can be used to implement a first predictor that provides first-predictor predicted branch result. Additionally, this example includes a predictor selector 3018, which provides a predicted branch result, for at least some branch instructions, based on a selected predictor of multiple predictors. The circuitry 301E includes at least one additional predictor, shown in FIG. 3E as a second predictor 320, which provides a second-predictor predicted branch result to the predictor selector 318. In other examples, there could be a third predictor providing a third-predictor predicted branch result to the predictor selector 3018, or any number of additional predictors. The second predictor 320 determines its predicted branch result independently from the branch prediction information within the storage 306. Since the second predictor 320 provides predicted branch results independently from the branch prediction information, the second predictor 320 does not need to update the branch prediction information stored in the storage 306 based on an actual branch result that is provided later in the pipeline. This can be accomplished, for example, by disabling the update provided by the update logic 308, or ignoring its output, when the second predictor 320 is selected. So, by selecting a result from one of the predictors to provide as the predicted branch result that is output from the branch prediction circuitry 301E, the predictor selector 318 is preventing an adversary program from reliably forcing a misprediction, even if it is able to warm up or otherwise affect the branch prediction information within the storage 306.

For some branch instructions, such as branch instructions with a lower privilege level (e.g., corresponding to lower exception levels EL0 and EL1), as determined by context information fed into the predictor selector 318, a first mode of operation can be selected in which the first-predictor predicted branch result is used. But, there can be a certain class of branch instructions, such as branch instructions associated with a privilege level in a subset of higher-privilege levels (e.g., corresponding to higher exception levels EL2 and EL3), for which a second mode of operation is used. For example, the second mode can be selected by setting a bit stored in hardware. The second mode can be selected after examining context information for each instruction, or the predictor selector 318 can make a decision to enter or leave the second mode at a coarser granularity than every instruction, such as for groups of instructions that are within a privileged region of code, for example. In the second mode of operation, the predictor selector 318 actively varies selection of an active predictor for different branch instructions for which the selected predictor's predicted branch result is being provided. The varying of the selection can be done in a manner that is not easily determined by an adversary program running at a lower privilege level, such as based on a hardware pseudo-random number generator within the predictor selector 318, or a randomized value generated a victim program running at a higher privilege level (e.g., running at one of the same privilege levels for which the second mode of operation is used).

In one example, there are two additional predictors, in addition to the first predictor that uses the branch prediction information in the storage 306. One additional predictor provides a first constant branch result value as the predicted branch result for all virtual addresses of branch instructions, such as a constant '0' not taken (NT) branch result. Another additional predictor provides a second constant branch result as the predicted branch result for all virtual addresses of branch instructions (different from the first constant branch result), such as a '1' taken (T) branch result. The predictor selector 318 can randomly select among the three predictors, or can randomly select among two of the three predictors. While leaving out the first predictor may be detrimental to performance, it would still mitigate against certain security vulnerabilities.

Alternatively, in another example, the predictor selector 318 can select between the first and second modes of operation, but in the second mode of operation, the prediction can be configured to always provide a constant branch result (e.g., a constant '0' not taken (NT) branch result).

In some examples, the processor 102 is configured to perform an operation as part of mitigating certain security vulnerabilities, and the predictor selector 318 is configured based on at least in part on that operation. For example, it may be useful to clear some or all of the memory structures on the processor 102 in response to executing a privileged branch instruction or in response to entering a privileged region of code. In particular, by clearing the branch prediction information storage 306, any information that was set up by an adversary program can be removed. In some processors, there is specialized circuitry that can be used to perform operations to clear memory structures. Clearing a memory structure removes information stored in that structure, for example, by setting all bits to a predetermined pattern, such as all zero bits, or a random pattern. But, if the branch prediction information storage 306 is cleared using a "clear operation" and access to the storage 306 is prevented during the clear operation, it may be useful to allow other instructions to proceed during the clear operation, since the clear operation may take many cycles (e.g., thousands of cycles) before being completed. In such examples, the predictor selector 318 can be configured to select the second predictor 320 during the clear operation, and the second predictor 320 can be configured to provide a constant branch result during the clear operation.

Processors and other integrated circuits can be complex and may include specialized circuitry that supports testing and other management of various structures on a fabricated chip. For example, in addition to a processor, or multiple processor cores, there may be various memory structures and devices that provide a variety of functionality used by, or operating alongside, a processor. One type of circuitry that facilitates testing and management of such structures is based on built-in self-test (BIST) and built-in self-repair (BISR) techniques. A BIST module on an integrated circuit may support a variety of commands that perform operations such as clearing memory structures including the branch prediction information storage 306. The operations that clear memory structures can be performed in different modes. For example, a "reset mode" may clear all memory structures on the processor (e.g., as part of booting a system that uses the processor), and a "non-reset mode" may clear only a specified set of one or more memory structures without clearing all memory structures on the processor. To reduce the number of cycles needed to perform a clear operation, a BIST clear operation can be used in the non-reset mode, with the storage 306 specified as the particular memory structure to be cleared.

Figure 3F:
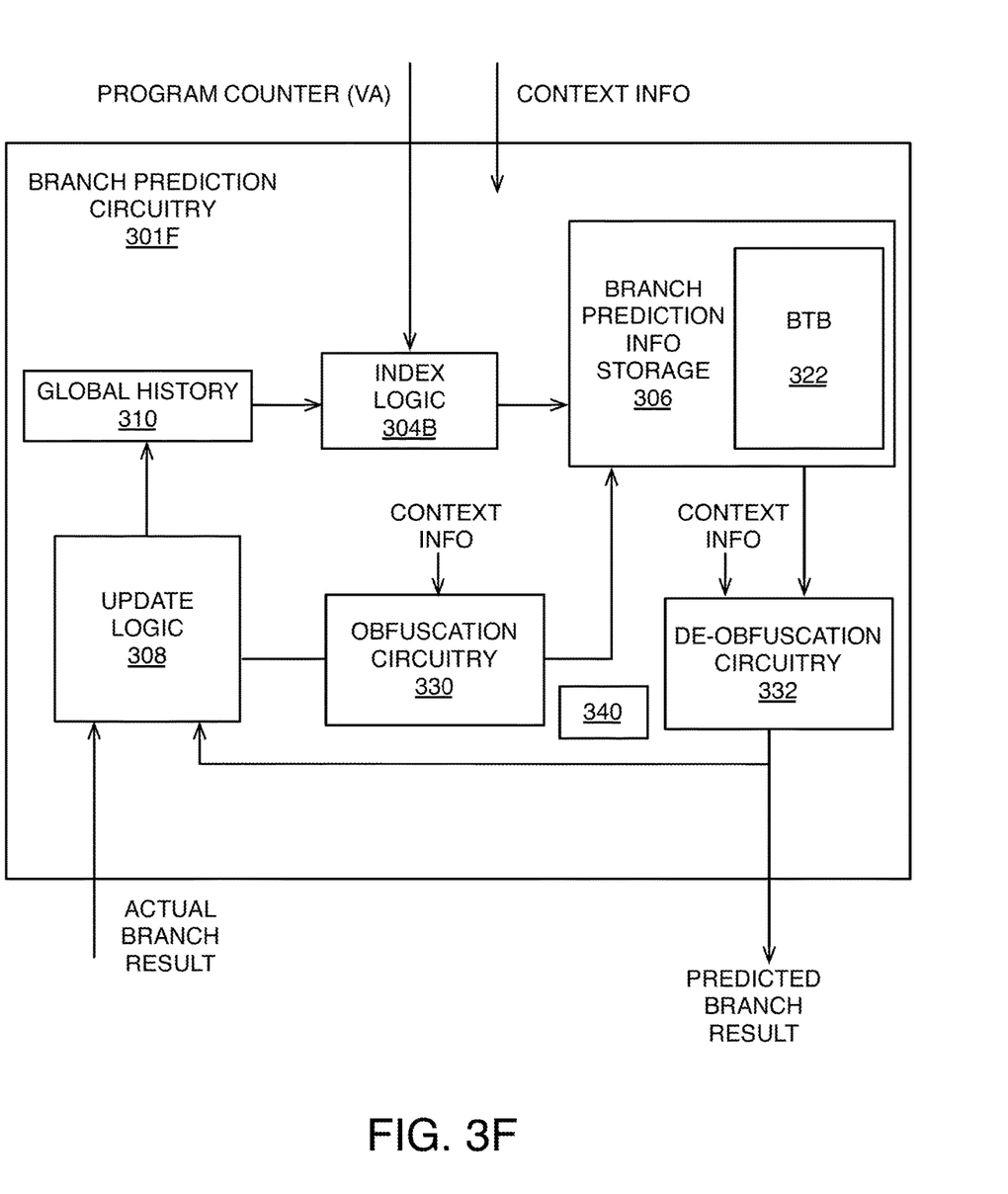

FIG. 3F shows branch prediction circuitry 301F configured to perform branch prediction using an obfuscation technique that obscures branch target addresses stored in a portion of the branch prediction information storage 306 that stores branch target addresses, called a branch target buffer 322. By obfuscating at least some branch target addresses (e.g., branch target addresses for branch instructions with context information indicating them as higher privileged instructions), certain potential vulnerabilities can be mitigated. Updating the branch prediction information stored in the storage 306 is still performed based on an actual branch result for a given execution of a particular branch instruction. But, if a branch target address is included in that actual branch result (for an unconditional branch instruction, or for a conditional branch instruction that resulted in a taken direction), then that branch target address is obfuscated by obfuscation circuitry 330.

In particular, the obfuscation circuitry 330 computes a randomized value (e.g., a pseudo-random number), and stores that randomized value in association with an identified subset of one or more contexts (e.g., using a CID, as described above, identifying a subset of contexts that contains fewer than all potential contexts, but includes a context associated with the particular branch instruction). In this example, storage 340 stores the randomized values in a data structure such as a table indexed by CIDs. The obfuscation circuitry 330 obfuscates the branch target address based at least in part on the randomized value. For example, the obfuscation may include performing an exclusive-OR (XOR) operation on the branch target address and the randomized value. The resulting obfuscated value output by the obfuscation circuitry 330 is stored in the branch prediction information storage 306, using the same index value that would have been used without the obfuscation.

When the branch prediction circuitry 301F provides a predicted branch result for a subsequent execution of the particular branch instruction whose previous results were obfuscated, de-obfuscation circuitry 332 is used. In particular, after retrieving the obfuscated value from the branch prediction information storage 306, and retrieving the randomized value from the storage 340, the de-obfuscation circuitry de-obfuscates the obfuscated value using the randomized value to recover the actual branch result as the predicted branch result. For example, the de-obfuscation may include performing an exclusive-OR operation on the obfuscated value and the randomized value. This works because performing an XOR operation twice using the same value results in no change to the bits of the value being operated upon. Each bit is simply flipped once and then flipped again back to its original value. Alternatively, any of a variety of other pairs of operations having this property could be used by the obfuscation circuitry 330 and the de-obfuscation circuitry 332 to obscure the bits of the branch target addresses stored in the BTB. Though, an advantage of the XOR operation is its speed.

In other examples of the obfuscation technique, the branch prediction circuitry does not include dedicated obfuscation and de-obfuscation circuitry in special-purpose hardware, but instead the transformations are performed in software executed by the general-purpose hardware of the processor 102.

Figure 4:
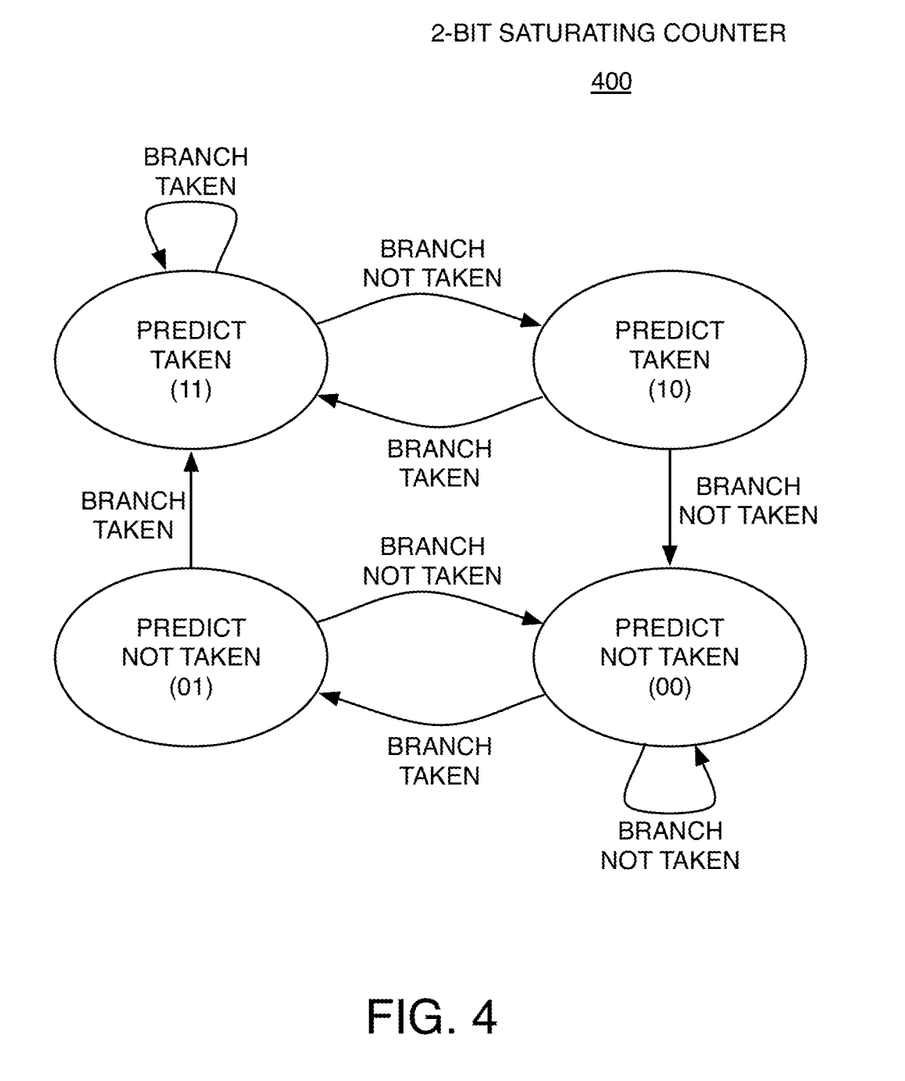
FIG. 4 is a state transition diagram for a 2-bit saturating counter.

FIG. 4 shows an example of a state transition diagram 400 for a 2-bit saturating counter that can be used to provide a predicted branch direction. There are two values of the 2-bit state variable (10 and 11) that predict a taken result, and two values of the 2-bit state variable (10 and 00) that predict a not taken result. Based on the state transitions in the diagram 400, it can be seen that it takes two of the same actual branch results in a row to switch from predicting one result to predicting the other result. The states are also known as "strongly not taken" (00), "weakly not taken" (01), "strongly taken" (11), and "weakly taken" (10).

In the example of FIG. 3B, storage of different CIDs into the CID storage 314 in association with different entries creates an explicit dynamic partitioning of the storage 306 into different partitions. But, there is also a form of implicit dynamic partitioning that occurs with the address translation example of FIG. 3A above, and with the examples of FIGS. 3C and 3D above, given that different context information maps a virtual address of a branch instruction to different non-overlapping partitions of entries.

Techniques of different examples can also be combined in different ways. For example, in the example of FIG. 3B, the index logic 304B computes an index value based on the untranslated virtual address represented by the PC, but in other examples, the translation of the example in FIG. 3A and the CID computation of the example in FIG. 3B could be combined.

Other embodiments are within the scope of the following claims.

What is claimed is:

1. An integrated circuit comprising:
at least one processor executing instructions in a pipeline, the instructions including branch instructions;
storage accessible to the pipeline for storing branch prediction information characterizing results of branch instructions previously executed by the processor;
first circuitry configured to provide a predicted branch result, for at least some branch instructions, based on a selected predictor of a plurality of predictors; and
second circuitry configured to provide an actual branch result based on an executed branch instruction, and to update the branch prediction information based on the actual branch result;
wherein the plurality of predictors include:
a first predictor that determines the predicted branch result based on at least a portion of the branch prediction information;
a second predictor that provides a first constant branch result value as the predicted branch result for all virtual addresses of branch instructions for which the predicted branch result is being provided.

2. The integrated circuit of claim 1, wherein providing a predicted branch result, for at least some branch instructions, includes providing a predicted branch result based at least in part on a selected mode of a plurality of modes of operation, where the plurality of modes of operation include:
a first mode of operation in which the predicted branch result is determined based on at least a portion of the branch prediction information, and
a second mode of operation in which the predicted branch result is determined based on a selected predictor of the plurality of predictors, where selection of the selected predictor varies for different branch instructions for which the predicted branch result is being provided.

3. The integrated circuit of claim 2, wherein providing a predicted branch result for a first branch instruction includes:
determining that the first branch instruction is associated with a privilege level in a predetermined subset of one or more privilege levels, and
in response to the determining, setting the selected mode to the second mode of operation.

4. The integrated circuit of claim 3, wherein providing a predicted branch result for a second branch instruction includes:
determining that the second branch instruction is associated with a privilege level outside the predetermined subset of one or more privilege levels, and
in response to the determining, setting the selected mode to the first mode of operation.

5. The integrated circuit of claim 1, wherein the plurality of predictors include a third predictor that provides a second constant branch result as the predicted branch result for all virtual addresses of branch instructions for which the predicted branch result is being provided, where the second constant branch result is different from the first constant branch result.

6. The integrated circuit of claim 1, wherein the second predictor is selected for branch instructions that are executed during an operation performed by the processor to clear at least a portion of the branch prediction information used for providing predicted branch results for multiple different branch instructions.

7. The integrated circuit of claim 6, wherein the operation performed by the processor comprises an operation to clear all of the branch prediction information stored in the storage.

8. The integrated circuit of claim 6, wherein the operation performed by the processor comprises a built-in self-test operation that selectively clears at least a portion of the branch prediction information stored in the storage without clearing all memory structures on the processor.

9. The integrated circuit of claim 1, wherein the updating of the branch prediction information by the second circuitry is disabled for a first branch instruction when the second predictor is selected for the first branch instruction.

10. The integrated circuit of claim 1, wherein selection of the selected predictor varies for different branch instructions based at least in part on a randomized value.

11. The integrated circuit of claim 1, wherein the selected predictor is selected using hardware within the first circuitry.

12. The integrated circuit of claim 1, wherein the selected predictor is selected using software executing on the processor at a privilege level in the predetermined subset of one or more privilege levels.

13. The integrated circuit of claim 1, wherein the branch instructions include conditional branch instructions, and the prediction information includes one or both of: (1) branch direction predictions that indicate whether a particular predicted branch result includes a taken (T) direction or a not taken (NT) direction, and (2) branch target predictions that indicate branch target addresses that are included within particular predicted branch results that also include a taken (T) direction.

14. A method comprising:
   executing instructions in a pipeline of at least one processor, the instructions including branch instructions;
   storing, in storage accessible to the pipeline, branch prediction information characterizing results of branch instructions previously executed by the processor;
   providing, from first circuitry, a predicted branch result, for at least some branch instructions, based on a selected predictor of a plurality of predictors; and
   providing, from second circuitry, an actual branch result based on an executed branch instruction, and updating the branch prediction information based on the actual branch result;
   wherein the plurality of predictors include:
      a first predictor that determines the predicted branch result based on at least a portion of the branch prediction information;
      a second predictor that provides a first constant branch result value as the predicted branch result for all virtual addresses of branch instructions for which the predicted branch result is being provided.

15. The method of claim 14, wherein providing a predicted branch result, for at least some branch instructions, includes providing a predicted branch result based at least in part on a selected mode of a plurality of modes of operation, where the plurality of modes of operation include:
   a first mode of operation in which the predicted branch result is determined based on at least a portion of the branch prediction information, and
   a second mode of operation in which the predicted branch result is determined based on a selected predictor of the plurality of predictors, where selection of the selected predictor varies for different branch instructions for which the predicted branch result is being provided.

16. The method of claim 15, wherein providing a predicted branch result for a first branch instruction includes:
   determining that the first branch instruction is associated with a privilege level in a predetermined subset of one or more privilege levels, and
   in response to the determining, setting the selected mode to the second mode of operation.

17. The method of claim 16, wherein providing a predicted branch result for a second branch instruction includes:
   determining that the second branch instruction is associated with a privilege level outside the predetermined subset of one or more privilege levels, and
   in response to the determining, setting the selected mode to the first mode of operation.

18. The method of claim 14, wherein the plurality of predictors include a third predictor that provides a second constant branch result as the predicted branch result for all virtual addresses of branch instructions for which the predicted branch result is being provided, where the second constant branch result is different from the first constant branch result.

19. The method of claim 14, wherein the second predictor is selected for branch instructions that are executed during an operation performed by the processor to clear at least a portion of the branch prediction information used for providing predicted branch results for multiple different branch instructions.

20. The method of claim 19, wherein the operation performed by the processor comprises an operation to clear all of the branch prediction information stored in the storage.

21. The method of claim 19, wherein the operation performed by the processor comprises a built-in self-test operation that selectively clears at least a portion of the branch prediction information stored in the storage without clearing all memory structures on the processor.

22. The method of claim 14, wherein the updating of the branch prediction information by the second circuitry is disabled for a first branch instruction when the second predictor is selected for the first branch instruction.

23. The method of claim 14, wherein selection of the selected predictor varies for different branch instructions based at least in part on a randomized value.

24. The method of claim 14, wherein the selected predictor is selected using hardware within the first circuitry.

25. The method of claim 14, wherein the selected predictor is selected using software executing on the processor at a privilege level in the predetermined subset of one or more privilege levels.

26. The method of claim 14, wherein the branch instructions include conditional branch instructions, and the prediction information includes one or both of: (1) branch direction predictions that indicate whether a particular predicted branch result includes a taken (T) direction or a not taken (NT) direction, and (2) branch target predictions that indicate branch target addresses that are included within particular predicted branch results that also include a taken (T) direction.

* * * * *